(12) United States Patent
Weber (10) Patent No.: US 6,178,732 B1
(45) Date of Patent: Jan. 30, 2001

(54) CHAIN LINK WHICH CAN BE ADAPTED TO A PLURALITY OF USE CONFIGURATIONS

(75) Inventor: Willibald Weber, Netphen (DE)

(73) Assignee: Kabelschlepp GmbH, Siegen (DE)

( * ) Notice: Under 35 U.S.C. 154(b), the term of this patent shall be extended for 0 days.

(21) Appl. No.: 09/284,611

(22) PCT Filed: Nov. 3, 1997

(86) PCT No.: PCT/EP97/06045

§ 371 Date: Apr. 28, 1999

§ 102(e) Date: Apr. 28, 1999

(87) PCT Pub. No.: WO98/23879

PCT Pub. Date: Jun. 4, 1998

(30) Foreign Application Priority Data

Nov. 26, 1996 (DE) .............................................. 196 48 967

(51) Int. Cl.[7] .................................................. F16G 13/16
(52) U.S. Cl. .............................. 59/78.1; 59/900; 248/49; 248/75
(58) Field of Search .............................. 59/78.1; 248/49, 248/51, 75

(56) References Cited

U.S. PATENT DOCUMENTS

| 4,769,985 | 9/1988 | Moritz . | |
|---|---|---|---|
| 4,962,639 | 10/1990 | Blase . | |
| 5,014,506 | 5/1991 | Moritz . | |
| 5,201,885 | * 4/1993 | Wehler et al. | 59/78.1 |
| 5,220,779 | * 6/1993 | Tatsuta et al. | 59/78.1 |

FOREIGN PATENT DOCUMENTS

| 91 02 121 U | 6/1991 | (DE) . |
| 91 09 241 U | 12/1991 | (DE) . |
| 0 343 192 | 11/1989 | (EP) . |
| 0 415 034 | 3/1991 | (EP) . |
| 2 007 326 | 5/1979 | (GB) . |
| WO 88/07637 | 10/1988 | (WO) . |

* cited by examiner

*Primary Examiner*—David Jones
(74) *Attorney, Agent, or Firm*—Alston & Bird LLP (57) ABSTRACT

The invention relates to a kit having a plurality of kit components for a chain link (54) which can be adapted to a plurality of situations of use and which has two chain side plates (54, 55), with the following kit components:

Separating bodies (46) with edge portions (3) and partitions (47) which can be secured to two adjacent separating bodies (46) by securing elements which at least partially embrace a holding portion (14) of the separating bodies (46). The kit may also have transverse portions (56, 57) provided with a holding region, to which the separating bodies (46) are releasably securable.

22 Claims, 7 Drawing Sheets

CHAIN LINK WHICH CAN BE ADAPTED TO A PLURALITY OF USE CONFIGURATIONS

BACKGROUND OF THE INVENTION

The present invention relates to a chain link used to form an energy conducting guide chain, and wherein the chain link can be adapted to a plurality of use configurations.

Supply lines for the feed of consumables of all kinds to movable machine apparatuses are laid in so-called energy guide chains. The energy guide chains have a plurality of pivotably interconnected chain links which form a passage for accommodating supply lines. The operation of laying supply lines in energy guide chains must be effected with a very high degree of care. In particular, laying a plurality of lines one upon the other and laying lines of different diameters in directly juxtaposed relationship should be avoided in order to ensure that the lines do not rub against each other, which can cause the lines to be damaged. Furthermore when laying supply lines which involve pressure hoses, account must be taken of the fact that they can move freely as they decrease or increase in length when subjected to varying pressure loadings. Electrical lines are also laid in an energy guide chain. If electrical lines are laid in the form of a bundle in an energy guide chain, there is the risk of the lines and possibly the energy guide chain being ruined if the energy guide chain comprises plastics material as electrical lines disposed in a bundle heat up during operation.

Different proposals have already been put forward for resolving those problems when laying supply lines in energy guide chains. An optimum solution is achieved by means of so-called apertured webs through which the laid lines are guided in mutually separated condition.

A further proposed solution is known from utility model No. G 91 02 121.9 U1. In accordance with that proposal an energy guide chain involves a division of the energy guide passage, and such division can be altered in a simple manner and using a few components of a simple construction. For that purpose it is proposed that separating webs and crossbar members are arranged between the transverse portions and the chain side plates. Each separating web has at least one opening which is arranged transversely to its longitudinal direction and which is open towards its web side. The crossbar member can be inserted into the opening, with the opening having an undercut configuration. Division of the energy guide passage with a separating web-crossbar member system is possible by means of two separating webs and a crossbar member. The energy guide passage can be divided into further portions by using a plurality of crossbar members and separating webs. In that case the crossbar members are held in the openings having an undercut configuration, in such a way that the crossbar members are prevented from unintentional release from the separating webs.

Utility model No. G 91 09 241.8 discloses an energy guide chain in which the space within the energy guide passage can be subdivided by separating bodies and partitions. The partitions have elastically deformable eyes which each have an inwardly facing retaining projection co-operating with corresponding retaining recesses in the separating bodies. The elastically deformable eyes embrace the separating body in question. Due to the configuration of the eyes in particular subsequent installation of the separating bodies with partitions in an energy guide chain is a relatively complicated and expensive operation.

A further proposal for a separating web-crossbar member system for an energy guide chain is known from EP 0 343 192. In accordance with EP 0 343 192 each separating web has on both sides one or more holding grooves which are distributed over its height and which are in mutual alignment on respective sides. At their ends the crossbar members have retaining noses which can each be selectively inserted into a respective one of the holding grooves. This embodiment requires a particular configuration in respect of the holding grooves and the retaining noses in order to ensure that the separating webs and the crossbar members do not already fall apart during the assembly operation. During operation of an energy guide chain the lines exert additional forces on the crossbar members and indirectly on the separating webs which must carry such forces. By virtue of the construction involved the separating webs must be of a suitable thickness whereby the space available in the guide passage is reduced.

Taking that state of the art as its basic starting point the invention is based on the problem of providing a kit for a chain link, whereby the chain link can be equipped for different situations of use. A further object of the invention is to provide a chain link and an energy guide chain which can both be adapted to varying situations of use.

SUMMARY OF THE INVENTION

The above and other objects and advantages of the invention are achieved by the provision of a chain link which comprises two spaced apart and parallel side plates and at least one transverse number extending transversely between and interconnecting the side plates. At least two separating bodies are mounted to the one transverse member, and the separating bodies are transversely spaced apart and have edge portions which extend in the upright direction. Each of the edge portions has a plurality of supports which are spaced apart from each other in the upright direction. At least one partition is also provided, which is configured so that it can be releasably connected between the two separating bodies with the partition being supported on a selected one of the supports along the edge portion of each separating body, and so that the partition lies in a generally transverse plane.

Preferably, the partition can be secured to the two separating bodies by securing elements which at least partially embrace a holding portion of the separating bodies. Also, the two separating bodies are preferably mounted between two transverse members of the chain link which are spaced apart in the upright direction and are releasably securable thereto.

The two separating bodies and the partitions may thus serve as a kit which affords a possible way of adapting a chain link to a plurality of situations of use. The kit components can be assembled in such a way that this provides a separating system for lines which can be fitted into a chain link. The partitions can be of different lengths whereby adaptation to different situations of use is improved. Assembly of the kit components is a relatively simple matter as the securing elements of the partitions can be connected to the edge portions in a structurally simple fashion. The separating bodies have a plurality of supports which extend substantially transversely to the longitudinal extent of the separating bodies and on which the partitions at least partially lie. That provides that the force generated by the weight of the line or lines is carried by the partitions and is transmitted to the separating body. That situation in terms of force relieves the load on the securing elements so that they are required to carry essentially only the force exerted by a line in the longitudinal direction of a chain link.

In order to facilitate positioning of the assembled kit components between two chain side plates of a chain link which are connected together by a transverse portion, it is proposed that the separating bodies, at their respective oppositely disposed end portions, have at least one projection extending in the longitudinal direction of the separating body. The projection can be caused to bear against the transverse portion. That prevents displacement of the assembled kit components in the longitudinal direction of the chain link. In accordance with a further advantageous development it is proposed that each separating body has only one projection at its respective end portion. A preferred configuration of the separating bodies is one in which the projections are diametrally displaced relative to each other.

If the separating bodies are individually arranged on a transverse portion, it is proposed that each separating body has two spaced projections at each of its respective end portions. The spacing between the projections in that arrangement is preferably such as to afford a positively locking connection between the projections and the transverse portion, in which case the separating bodies permit displacement on the transverse portion in the longitudinal direction thereof.

For stationarily positioning the separating bodies on a transverse portion, a further advantageous embodiment of the separating bodies proposes that at at least one end portion said separating bodies have at least one retaining nose which extends in the longitudinal direction of the separating web and which co-operates with the holding region of the transverse portion. That provides an arresting action for arresting the separating bodies on the transverse portion.

In accordance with a further advantageous concept it is proposed that the separating body has abutments which are provided above the supports. That prevents the partition from lifting off a support.

In order to be able to subdivide the free cross-section of the chain side plates by a minimum possible number of kit components, it is proposed that the supports and possibly the abutments are provided in aligned relationship on both sides of the separating body. That affords a separating body which can be fitted with partitions on both sides. The supports and possibly the abutments are preferably provided on a substantially plate-shaped carrier element with longitudinal edges. The supports and possibly the abutments extend over the entire transverse extent of the carrier element. A preferred configuration of the separating body however is one in which the supports and possibly the abutments are provided only over a part of the transverse extent of the carrier element. The supports and possibly the abutments extend from the longitudinal edges inwardly into the carrier element.

In accordance with a further advantageous configuration of the kit it is proposed that each holding portion of a separating body is of a columnar configuration. In the case of a separating body which has two columnar holding portions, between which the carrier element is arranged, a partition can be connected to the edge portions both from the one side and also from the other side.

In order to achieve a relatively high level of stability for the separating body, it is proposed that each columnar holding portion is connected to the carrier element by way of at least one connecting element. The holding portions are preferably of a substantially at least part-circular cross-section. The internal width of the holding portions in the region of the support is preferably less than the thickness of the separating body, in particular the carrier element. A suitable configuration in respect of the securing elements provides a connection between the separating bodies and the partitions, in which the connecting location does not further reduce the intermediate space.

The partitions can be of a plate-like configuration. They rest on the supports. A preferred configuration of the partitions is one which has support tongues. The length of the support tongues preferably substantially corresponds to the length of the supports.

The partitions are preferably secured to the holding portions of the separating bodies by way of securing elements which are at least partially resilient. The partitions are connected to the separating bodies by way of the securing elements virtually by clipping engagement. In that respect a preferred embodiment of the securing elements is one in which they have an open passage portion through which a holding portion can be introduced into a receiving means for at least partially embracing same. In that case the internal width of the passage portion is preferably smaller than the internal width of the holding portion.

To solve the above-indicated problem there is also proposed a chain link having two chain side plates and which has at least one pivotal portion for pivotal connection to another chain link, which is distinguished in that it is completed with the kit components according to one of claims 1 to 19. There is also proposed an energy guide chain according to the invention with chain links which each have chain side plates and at least one pivotal portion for pivotal connection to another chain link, which chain is distinguished in that it is completed with at least one chain link according to claim 20.

DETAILED DESCRIPTIONS OF THE PREFERRED EMBODIMENTS

Further details and advantages of the kit and a chain link are described with reference to the embodiments illustrated in the drawing in which.

Figure 1:
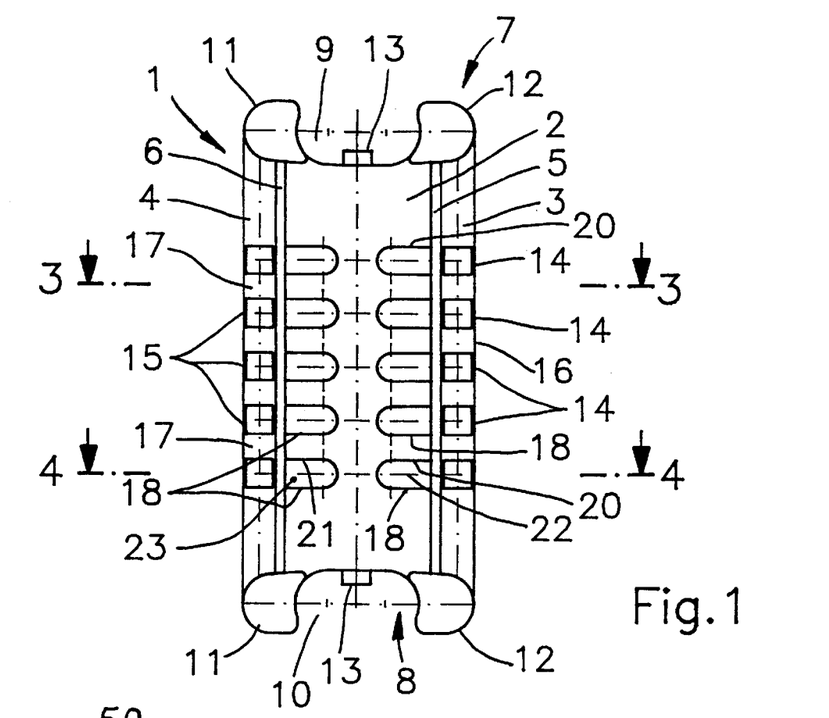
FIG. 1 is a front view of the first embodiment of a separating body.
Figure 3:
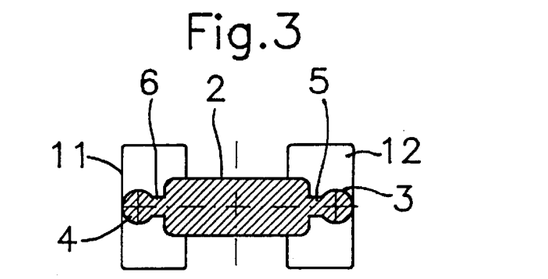
FIG. 3 is a view in section taken along line 3—3 in FIG. 1.
Figure 4:
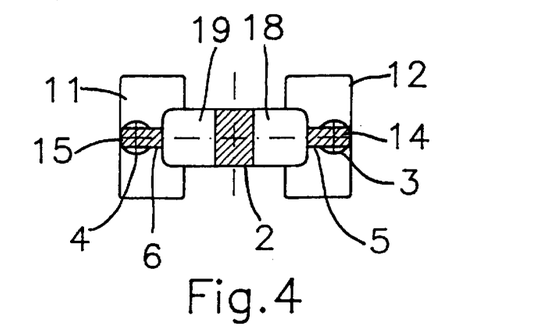
FIG. 4 is a view of the separating body in section taken along line 4—4 in FIG. 1.

FIG. 1 shows a first embodiment of a separating body 1 which forms a component of a kit with a plurality of kit components for a chain link which can be adapted to a plurality of situations of use and which has two chain side plates. The separating body 1 has a substantially plate-shaped carrier element 2. The carrier element 2 is arranged between two edge portions 3, 4 of columnar configuration. The columnar edge portions 3, 4 are each connected to the carrier element 2 by way of a respective connecting element 5, 6, as can be seen in particular from FIGS. 3 and 4. The connecting elements 5, 6 are webs which extend over the entire length of the separating body 1. The edge portions 3, 4 extend substantially parallel to the axis 50.

At each of its end portions the separating body 1 has a respective receiving means 9 and 10 which is partially defined by two spaced projections 11, 12. The inside contour of the receiving means 9, 10 is adapted to a corresponding outside contour of a transverse portion. In the assembled condition of the separating body 1 a transverse portion (not shown) engages into the respective receiving means 9 or 10. For arresting the separating body on a transverse portion the separating body has a retaining or latching nose 13. The retaining nose 13 engages into a holding region of a transverse portion.

Figure 6:
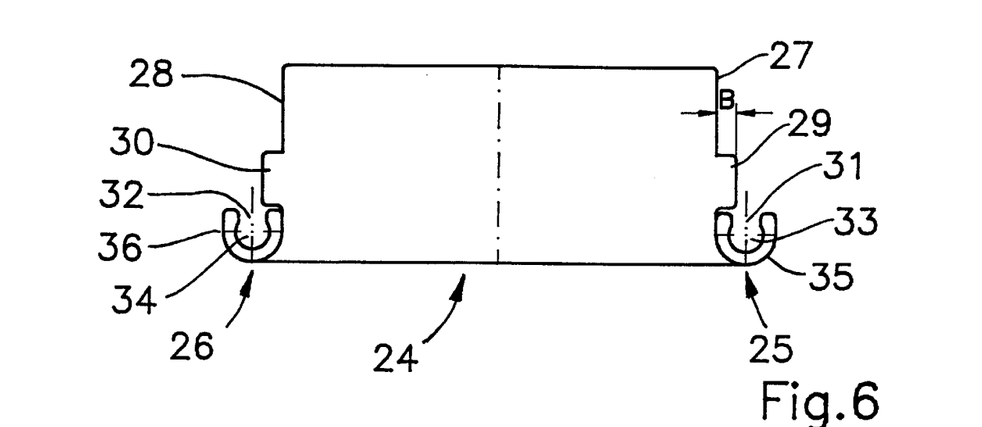
FIG. 6 is a plan view of the partition shown in FIG. 5.
Figure 7:
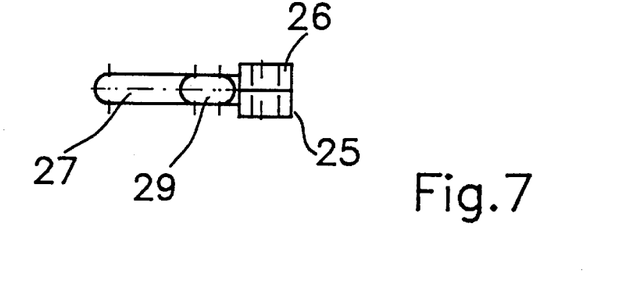
FIG. 7 is a side view from the left of the partition shown in FIG. 5.

For releasably securing a partition as is shown for example in FIG. 6, the separating body 1 has holding portions 14, 15. The holding portions 14 are provided on the edge portion 3 of the separating body 1 and the holding portions 15 are provided on the edge portion 4 of the separating body 1. The holding portions 14, 15 are of a substantially rectangular cross-section. The edge portion 3 has a plurality of holding portions 14 which are arranged in mutually spaced relationship. Provided between the holding portions 14 are portions 16 which are of a larger cross-section than the holding portions 14. Corresponding portions 17 are provided between the holding portions 15 of the edge portion 4.

Figure 2:
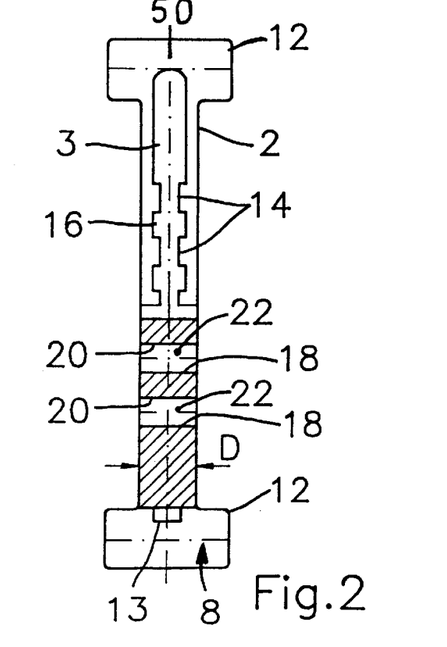
FIG. 2 is a partly sectional side view from the left of the separating body shown in FIG 1.

The carrier element 2 of the separating body 1 has a plurality of supports 18, 19 which extend substantially transversely with respect to the longitudinal extent of the support body 1. The supports 18 extend from the edge portion 3 inwardly into the carrier element 2. The supports 18 are substantially aligned with the holding portions 14. They extend over a part of the width of the carrier element 2. The supports 19 are substantially aligned with the holding portions 15. The supports 19 also extend only over a part of the width of the carrier element 2. As can be seen in particular from FIGS. 2 and 4 the internal width of the holding portion 14 or 15 respectively is smaller in the region of the support 18 or 19 respectively than the thickness of the carrier element 2.

The carrier element 2 has abutments 20, 21. An abutment 20 is associated with each support 18. The abutment 20 is disposed opposite the support 18. In the illustrated embodiment of FIG. 1 each support 19 has an abutment 21. The abutment 21 is disposed opposite the support 19.

A support 18 and an abutment 20, as well as a support 19 and an abutment 21, are formed by cut-out openings 22 and 23 respectively.

FIGS. 5 to 8 show an embodiment of a partition 24. The partition 24 is of a substantially plate-like configuration. It has two securing elements 25, 26 which at least partially embrace the holding portions 14, 15, as is shown in FIG. 9. The securing elements 25, 26 are provided on the narrow sides 27, 28. Provided on each narrow side 27 and 28 is a respective support tongue 29 and 30 respectively which extends over a part of the longitudinal extent of the narrow side 27 and 28 respectively. The extent of the support tongues 29, 30 substantially corresponds to the length of the respective supports 18 and 19. The width B of the support tongues 29, 30 is preferably no greater than half the thickness D (FIG. 2) of the carrier element 2.

Figure 5:
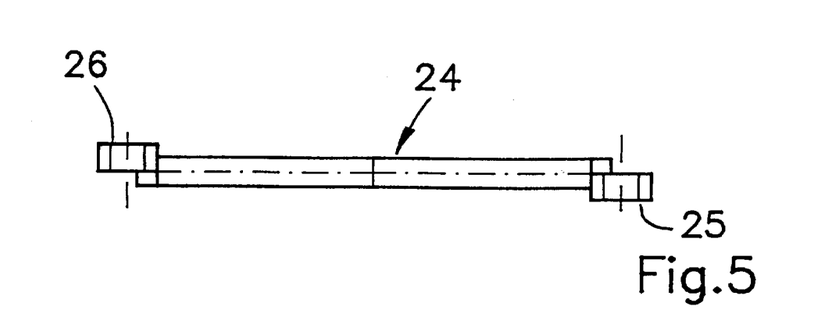
FIG. 5 is a front view of a first embodiment of a partition.

The securing elements 25, 26 each have an open passage portion 31 and 32 respectively. The passage portion 31 and 32 respectively increases in size into a receiving means 33 and 34 respectively. The securing elements are of an at least partially resilient nature. When the partitions are fixed to the separating body the limbs 35 and 36 respectively of the securing elements 25, 26 spring open.

As can be seen from FIG. 5 the securing elements 25, 26 are in mutually displaced relationship.

Figure 8:
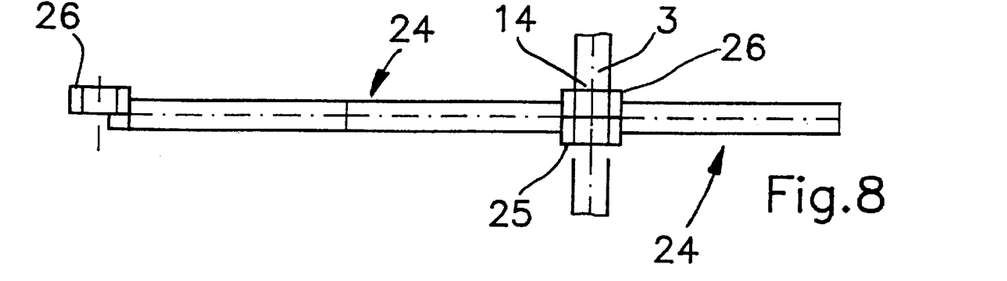
FIG. 8 shows two partitions as illustrated in FIG. 5, in side-by-side relationship.
Figure 9:
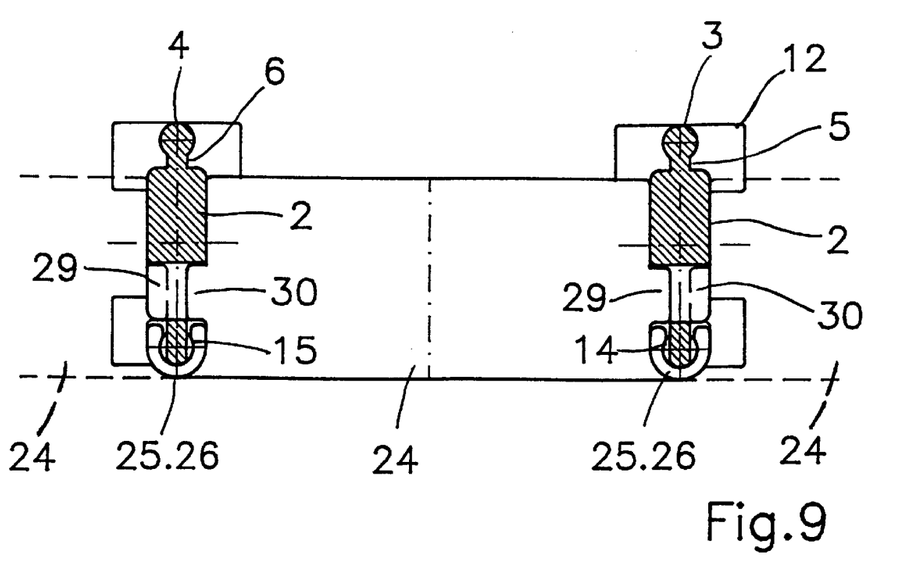
FIG. 9 shows a plan view and a view in section of two separating bodies as shown in FIG. 1 in conjunction with a partition as shown in FIG. 5.
Figure 10:
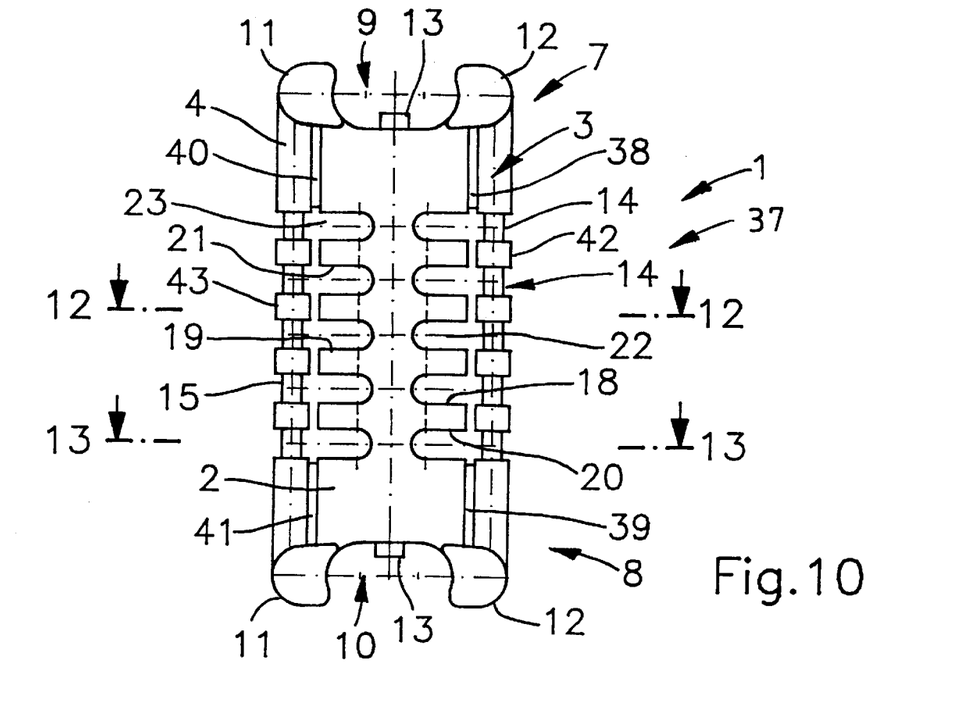
FIG. 10 is a front view of a second embodiment of a separating body.
Figure 11:
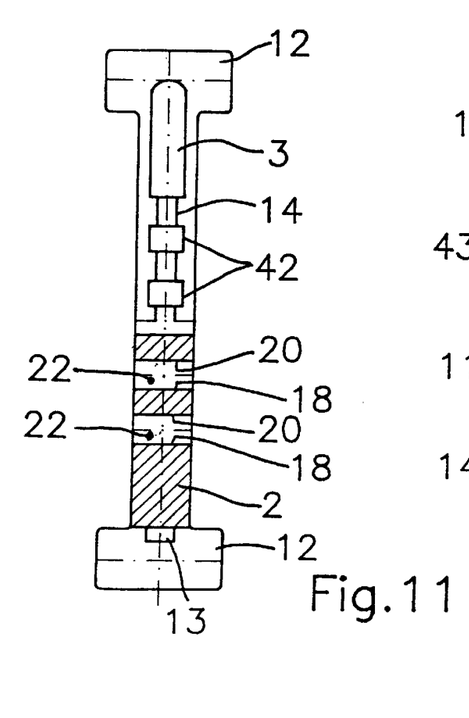
FIG. 11 is a partly sectional side view of the separating body shown in FIG. 10.
Figure 12:
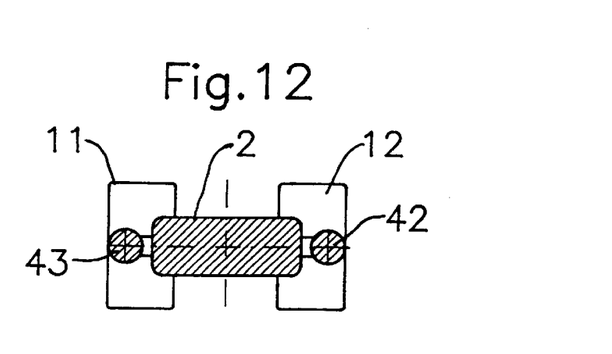
FIG. 12 is a plan view in section taken along line 12—12 in FIG 10.
Figure 13:
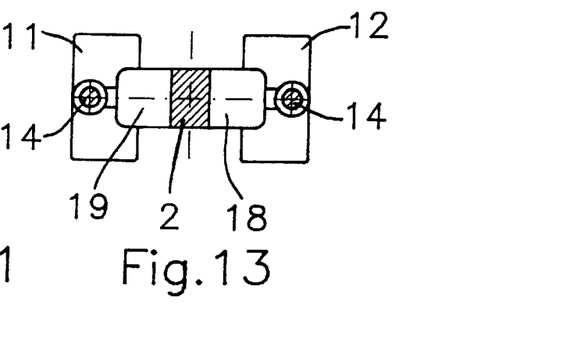
FIG. 13 is a plan view in section taken along 13—13 in FIG. 10.
Figures 14, 15:
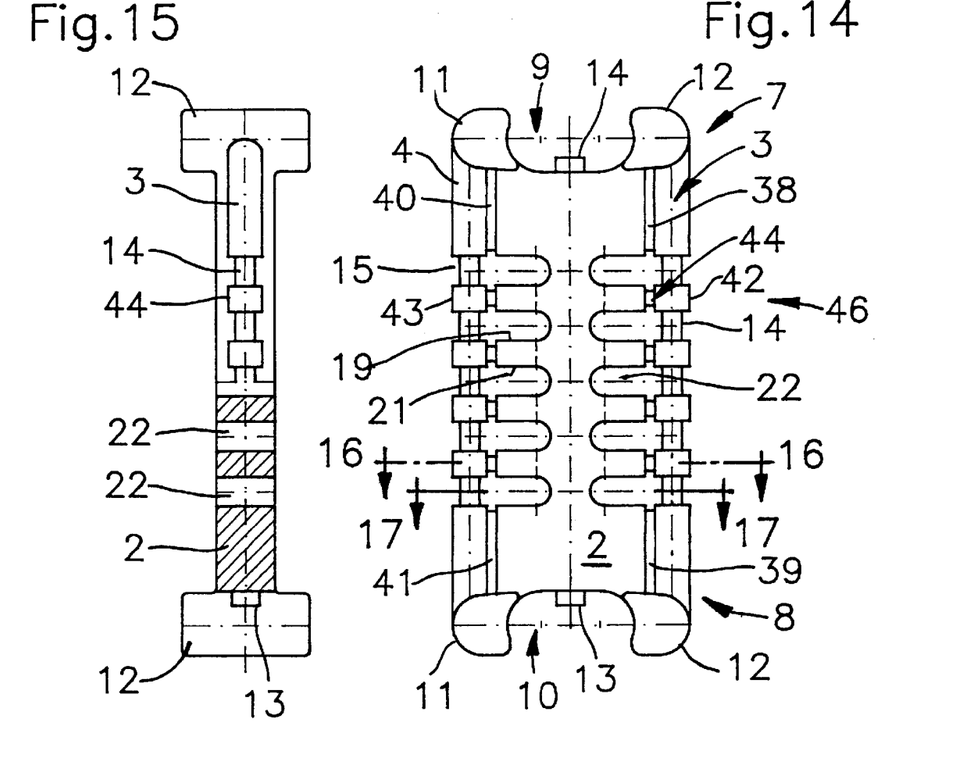
FIG. 14 is a front view of the second embodiment of a separating body.
FIG. 15 is a partly sectional side view from the right of the separating body shown in FIG. 14.
Figure 16:
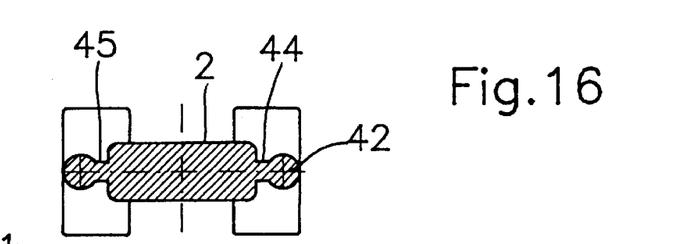
FIG. 16 is a view in section taken along line 16—16 in FIG. 14.
Figure 17:
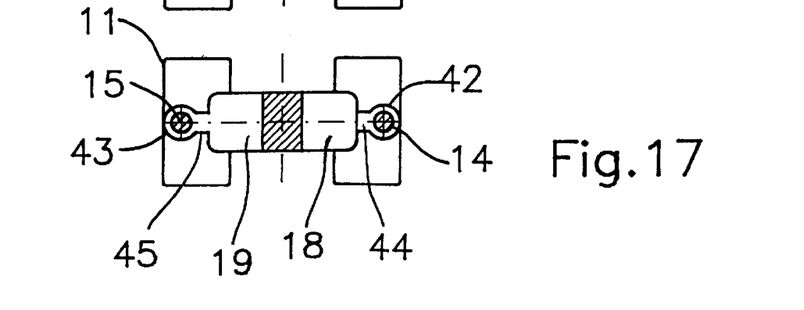
FIG. 17 is a plan view taken along section line 17—17 in FIG. 14.

FIG. 8 shows two partitions 24. The partitions 24 are arranged on a common holding portion 14. Due to the displaced arrangement of the securing elements 26 and 25 respectively the adjacent partitions 24 form a common support plane for lines which are guided in an energy guide chain.

FIG. 9 shows an arrangement of two separating bodies I with a partition 24. The separating bodies 1 correspond to the separating body shown in FIGS. 1 to 4. The partition 24 corresponds to the partition shown in FIGS. 5 to 7. As can be seen from FIG. 9 the securing elements 25, 26 partially embrace the holding portions 14 and 15 respectively of the separating body 1. The support tongues 29, 30 rest on the supports 18 and 19 respectively. With an arrangement of two partitions 24 as are illustrated in FIG. 8, the tongues 29 and 30 respectively of the adjacent partitions 24 lie on the common receiving means 18. That arrangement is shown in broken line in FIG. 9.

FIGS. 10 to 13 show a further embodiment of a separating body 37. The structure in principle of a separating body 37 corresponds to the structure of the separating body 1 as is shown in FIGS. 1 to 4. The separating body 37 has a carrier element 2 arranged between the edge portions 3, 4. The edge portions 3, 4 are of a substantially columnar configuration. Provided in the region of the end portions 7, 8 of the separating body 37 are connecting elements 38, 39 which connect the carrier element 2 to the edge portion 3. The edge portion 4 is connected to the carrier element 2 by way of connecting elements 40, 41.

The edge portions 3, 4 are of a columnar configuration. They are each of a substantially circular cross-section. Each edge portion 3, 4 has a plurality of holding portions 14 and 15 respectively which are distributed over their length. The holding portions 14, 15 are in aligned relationship. They are also aligned with the cut-out openings 22, 23.

Provided between the individual holding portions 14, 15 are spacer portions 42 and 43 respectively. The spacer portions 42 and 43 are of a circular cross-section. They are formed coaxially with respect to the holding portions 14 and 15 respectively. The diameter of the spacer portions 42, 43 is larger than the diameter of the holding portions 14 and 15 respectively. They each form a respective collar against which the respective end surface of the securing element 25, 26 of a partition 24 can be brought to bear.

FIGS. 14 to 17 show a further embodiment of a separating body 46. The separating body 46 represents a variant of the separating body 37 shown in FIGS. 10 to 13. In regard to details therefore attention is directed to the description of the separating body 37. The modified separating body 46 differs from the separating body 37 shown in FIGS. 10 to 13 in that the edge portions 3, 4 are connected to the carrier element 2 by additional connecting elements 44, 45. The connecting elements 44, 45 are webs which connect the spacer portions 42, 43 to the carrier element 2. That provides for a very strong and stable separating body 46. The edge portions 3, 4 which are of a columnar configuration do not bend under a loading.

Figure 18:
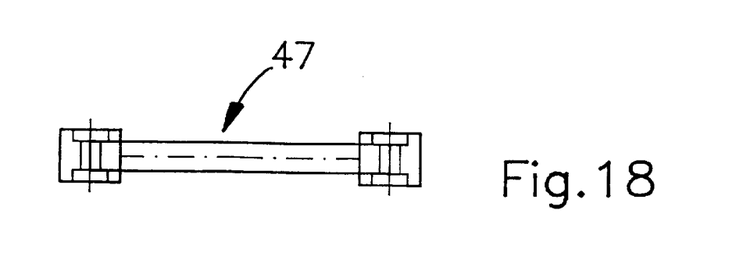
FIG. 18 is a front view of the second embodiment of the partition.
Figure 19:
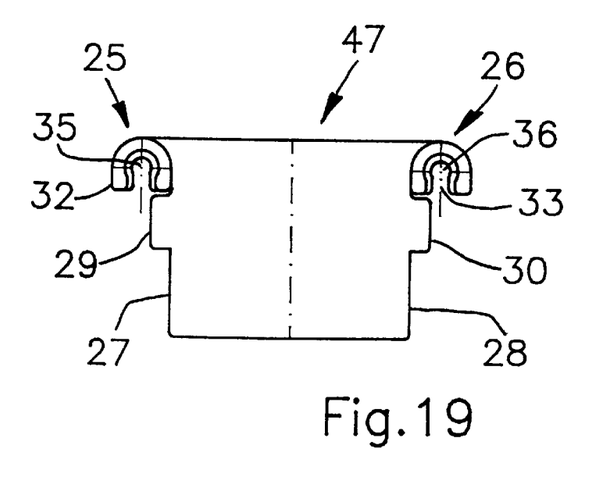
FIG. 19 is a plan view of the partition shown in FIG. 18.
Figure 20:
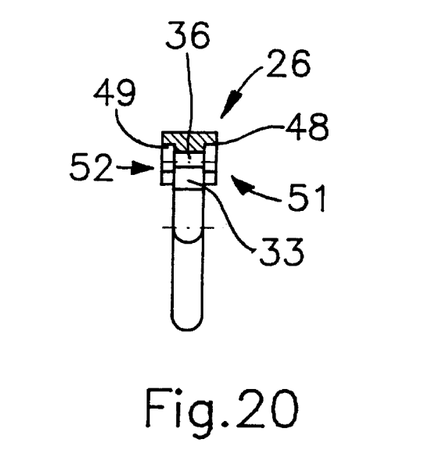
FIG. 20 is a side view of the partition shown in FIG. 18.
Figure 21:
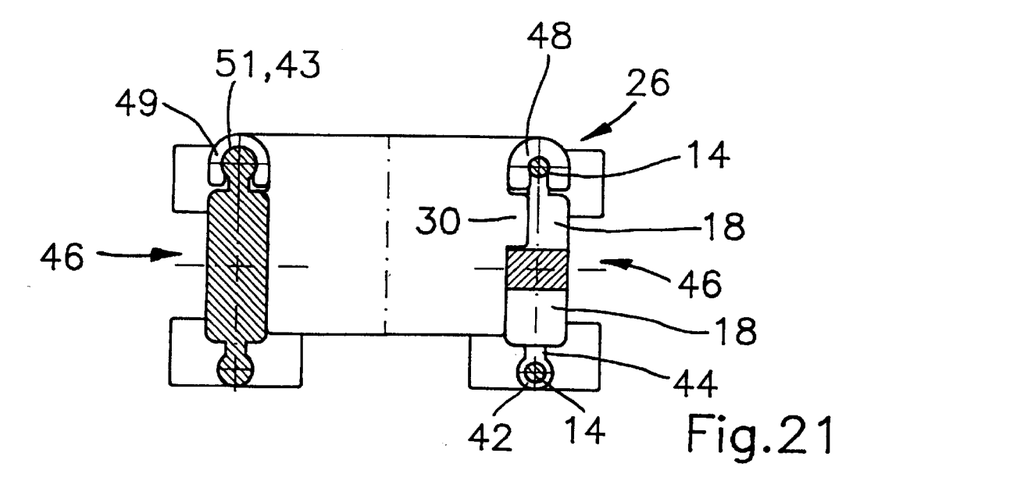
FIG. 21 is a plan view of an arrangement of two separating bodies as shown in FIG. 14 in conjunction with a separating partition as shown in FIG. 18.
Figure 22:
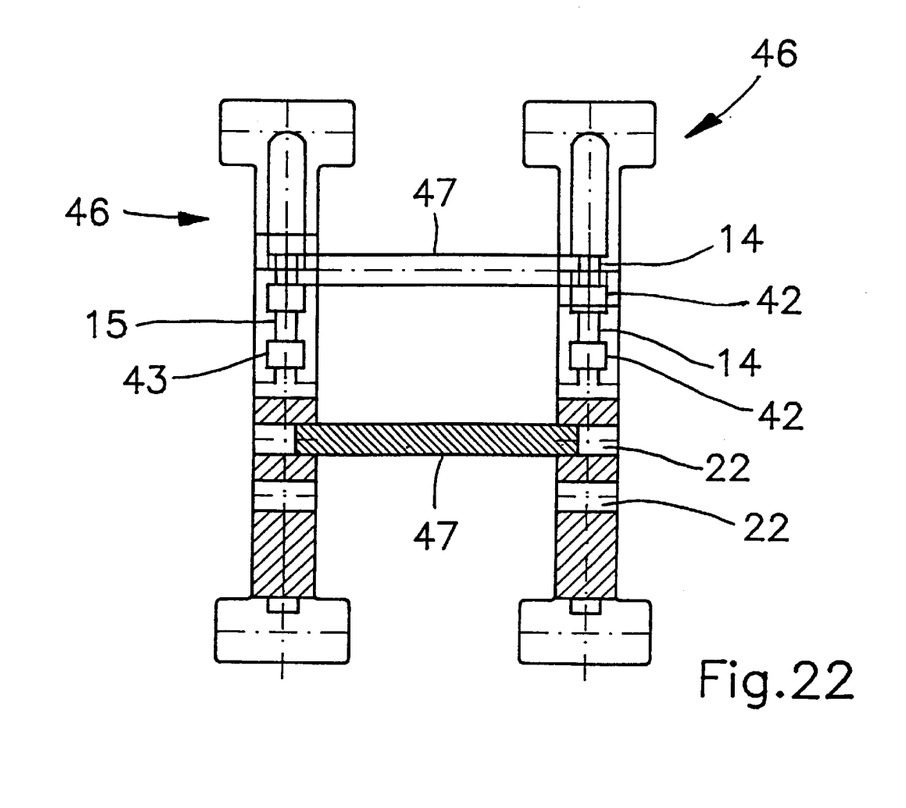
FIG. 22 is a front view of the arrangement shown in FIG. 21.
Figure 23:
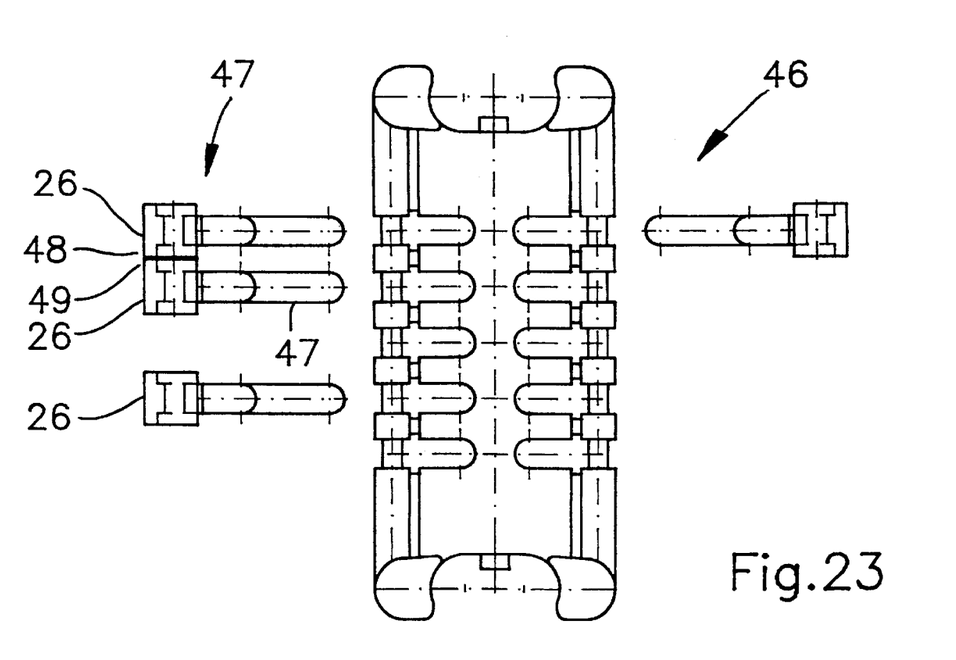
FIG. 23 is a diagrammatic view of a separating body as shown in FIG. 14 with partitions as shown in FIG 18.

A further configuration of a partition 47 is shown in FIGS. 18 to 20. The embodiment of the partition 47 shown in those Figures differs from the partition 24 shown in FIGS. 5 to 7 essentially in regard to the configuration of the securing elements 25, 26. The securing elements 25, 26 are of a substantially U-shaped configuration. They each have an open passage portion 32, 33. The passage portion 32 of the securing element 25 enlarges into a receiving means 36. The passage portion 33 enlarges into a receiving means 36 of the securing element 26. In the assembled condition of the partition 47 the securing element 25 or 26 respectively embraces the holding portion 14 and 15 respectively of the separating body 46, as is shown in FIG. 21. Each securing element 25, 26 has a respective collar 48, 49 on each side of the respective receiving means 35, 36. The collar 48, 49 defines an opening 51 and 52 respectively which corresponds to the open passage portion and the receiving means. The geometry of the opening 51, 52 is matched to the outside geometry of the spacer portions 42, 43 respectively. FIG. 21 shows that the collar 48 bears with its opening 51 against the spacer portion 43. The collars 48 and 49 contribute together with the spacer portions 42 and 43 respectively to holding the partition 47 to the separating body 46.

If two partitions 47 are arranged in immediately superposed relationship on the separating body 46 then the collars 48, 49 rest one upon the other. The partitions 47 support each other.

Figure 24:
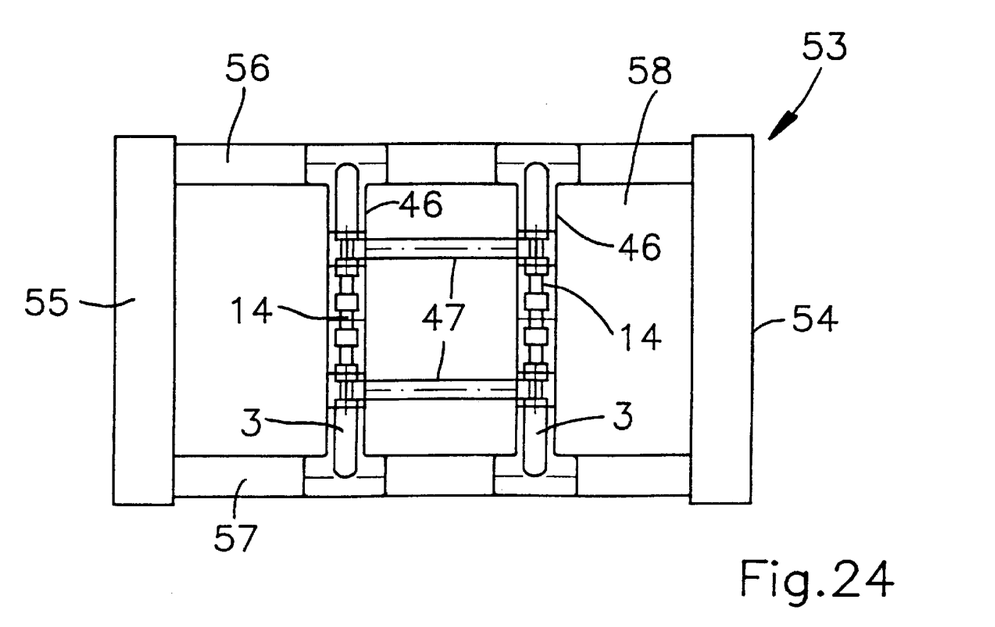
FIG. 24 is a front view of a chain link.

FIG. 24 shows a chain link 53 having two chain side plates 54, 55. The chain side plates 54, 55 are arranged at a spacing from each other and they are interconnected by way of transverse portions 56, 57. At least one of the transverse portions 56, 57 is releasably connected to the chain side plates 54, 55. Two separating bodies 46 are arranged in the receiving passage portion 58 defined by the chain side plates 54, 55 and the transverse portions 56, 57. The end portions of the separating bodies 46 are releasably connected to the transverse portion 56 and 57 respectively. The separating bodies 46 are arranged at a spacing relative to each other. Arranged between the separating bodies 46 and parallel to the transverse portion 56 and 57 respectively are two partitions 47 which are secured to the separating bodies 46. An energy guide chain with chain links which each have chain side plates and at least one pivotal portion for pivotal connection to another chain link includes at least one chain link which is completed with the kit components which are the separating bodies 1, 37 or partitions 24, 27.

The above-illustrated embodiments show possible alternative forms in regard to the design configuration of the separating bodies and the carrier elements. The combinations illustrated in the Figures of the separating bodies and carrier elements are given by way of example. Different combinations of separating bodies and carrier elements are possible.

What is claimed is:

1. A chain link which can be adapted to a plurality of configurations to accommodate different situations of intended use, comprising two spaced apart and parallel side plates, with the side plates defining a longitudinal direction along the length thereof and an upright direction along the height thereof, at least one transverse member extending transversely between and interconnecting the side plates, at least two separating bodies mounted to said one transverse member, with said separating bodies being transversely spaced apart and having edge portions which extend in the upright direction, with each of said edge portions having a plurality of supports which are spaced apart from each other in the upright direction, at least one generally flat partition, means for releasably connecting the one partition between the two separating bodies with the partition being supported on a selected one of the supports along the edge portion of each separating body, and so that the one partition lies in a generally transverse plane, and wherein each separating body has opposite edge portions both which have said plurality of supports, and with the supports on the opposite edge portions being respectively aligned when viewed in the longitudinal direction of the side plates.

2. The chain link according to claim 1, wherein each of the at least two separating bodies have opposite end portions, with one of the opposite end portions having at least one projection which extends in the upright direction so as to partially embrace the one transverse member.

3. The chain link according to claim 2, wherein the one opposite end portion has two spaced apart projections which extend in the upright direction so as to partially embrace the one transverse member there between.

4. The chain link according to claim 2, wherein the one opposite end portion has at least one retaining nose which extends in the upright direction and which engages a cooperating holding region on the one transverse member.

5. The chain link according to claim 2, wherein the supports on the side edge portions of the two separating bodies each comprise a transverse surface, and wherein an abutment surface is formed above each transverse surface so as to oppose the transverse surface.

6. The chain link according to claim 5, wherein each transverse surface and the associated abutment surface is formed by a cut-out slot in the associated edge portion.

7. The chain link according to claim 1, wherein said chain link comprises a plurality of said generally flat partitions, and wherein at least one partition is supported along each edge portion on one side of the two separating bodies and at least one partition is supported along each edge portion on the other side of the two separating bodies.

8. The chain link according to claim 1, wherein the releasable connecting means comprises a columnar holding portion along the edge portion of each separating body, and a pair of securing elements on each partition for releasably engaging respective holding portions.

9. The chain link according to claim 8, wherein each securing element is of generally C-shape to embrace the associated columnar holding portion.

10. The chain link according to claim 9, wherein the pair of securing elements of each partition are offset from each other in the upright direction so as to permit transversely aligned partitions to be received on a common support.

11. The chain link according to claim 9, wherein each separating body comprises a generally flat central carrier element, and wherein the columnar holding portion has a diameter which is less than the thickness of the carrier element.

12. The chain link according to claim 9, wherein the one partition has opposite side edges, with each side edge including a support tongue which is positioned to rest upon the associated support.

13. A chain link which can be adapted to a plurality of configurations to accommodate different situations of intended use, comprising two spaced apart and parallel side plates, with the side plates defining a longitudinal direction along the length thereof and an upright direction along the height thereof, at least one transverse member extending transversely between and interconnecting the side plates, at least two separating bodies mounted to said one transverse member, with said separating bodies being transversely spaced apart and having edge portions which extend in the upright direction, with each of said edge portions having a plurality of supports which are spaced apart from each other in the upright direction, at least one generally flat partition, means for releasably connecting the one partition between the two separating bodies with the partition being supported on a selected one of the supports along the edge portion of each separating body, and so that the one partition lies in a generally transverse plane, and wherein the releasable connecting means comprises a columnar holding portion along the edge portion of each separating body, and a pair of securing elements on each partition for releasably engaging respective holding portions.

14. The chain link according to claim 13, wherein each securing element is of generally C-shape to embrace the associated columnar holding portion.

15. The chain link according to claim 14, wherein the pair of securing elements of each partition are offset from each other in the upright direction so as to permit transversely aligned partitions to be received on a common support.

16. The chain link according to claim 14, wherein each separating body comprises a generally flat central carrier element, and wherein the columnar holding portion has a diameter which is less than the thickness of the carrier element.

17. The chain link according to claim 14, wherein the one partition has opposite side edges, with each side edge including a support tongue which is positioned to rest upon the associated support.

18. A chain link which can be adapted to a plurality of configurations to accommodate different situations of intended use, comprising two spaced apart and parallel side plates, with the side plates defining a longitudinal direction along the length thereof and an upright direction along the height thereof, at least one transverse member extending transversely between and interconnecting the side plates, at least two separating bodies mounted to said one transverse member, with said separating bodies being transversely spaced apart and having edge portions which extend in the upright direction, with each of said edge portions having a plurality of supports which are spaced apart from each other in the upright direction, at least one generally flat partition, means for releasably connecting the one partition between the two separating bodies with the partition being supported on a selected one of the supports along the edge portion of each separating body, and so that the one partition lies in a generally transverse plane, and wherein the one partition has opposite side edges, with each side edge including a support tongue which is positioned to rest upon the associated support.

19. The chain link according to claim 18, wherein the releasable connecting means comprises a columnar holding portion along the edge portion of each separating body, and a pair of C-shaped securing elements on each partition for releasably engaging respective holding portions.

20. The chain link according to claim 18 wherein the chain link comprises two of said transverse members which are spaced apart in the upright direction, and wherein the at least two separating bodies are mounted to and extend between the two transverse members.

21. The chain link according to claim 20 wherein each of the at least two separating bodies have opposite end portions, with each of the opposite end portions of each separating body having two spaced apart projections which extend in the upright direction so as to partially embrace the adjacent transverse member therebetween.

22. The chain link according to claim 21 wherein each of the opposite end portions of each separating body has at least one retaining nose which extends in the upright direction and which engages a cooperating holding region on the adjacent transverse member.

* * * * *

UNITED STATES PATENT AND TRADEMARK OFFICE
CERTIFICATE OF CORRECTION

PATENT NO. : 6,178,732 B1
DATED : January 30, 2001
INVENTOR(S) : Weber

It is certified that error appears in the above-identified patent and that said Letters Patent is hereby corrected as shown below:

<u>Column 4,</u>
Lines 32-33, "DETAILED DESCRIPTION OF THE PREFERRED EMBODIMENTS" should read -- BRIEF DESCRIPTON OF THE DRAWINGS --.

<u>Column 5,</u>
Following line 16, insert the following sub-heading:
-- DETAILED DESCRIPTION OF THE PREFERRED EMBODIMENTS --.

Signed and Sealed this

Twenty-fifth Day of September, 2001

*Attest:*

*Attesting Officer*

NICHOLAS P. GODICI
*Acting Director of the United States Patent and Trademark Office*